United States Patent

Fry et al.

(10) Patent No.: US 6,495,121 B2
(45) Date of Patent: *Dec. 17, 2002

(54) CHEWING GUM CONTAINING DIPETIDE SWEETENER WITH LENGTHENED AND IMPROVED FLAVOR

(75) Inventors: John C. Fry, Horsham (GB); Annette C. Hoek, Kerkrade (NE); Astrid E. Kemper, Maastricht, NE (US)

(73) Assignee: Holland Sweetner Company V.O.F., Gelen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/232,808

(22) Filed: Jan. 19, 1999

(65) Prior Publication Data

US 2002/0009419 A1 Jan. 24, 2002

Related U.S. Application Data

(63) Continuation of application No. PCT/NL97/00414, filed on Jul. 14, 1997.

(30) Foreign Application Priority Data

Jul. 16, 1996 (NE) ............................................. 1003606

(51) Int. Cl.⁷ ............................ A61K 9/68; A23G 3/30; A23L 1/236
(52) U.S. Cl. .............................. 424/48; 426/3; 426/548
(58) Field of Search ................................ 424/48; 426/3, 426/548

(56) References Cited

U.S. PATENT DOCUMENTS 4,597,970 A * 7/1986 Sharma et al. ................. 426/5
5,064,658 A 11/1991 Cherukuri et al.
5,094,858 A 3/1992 Yatka et al.
5,192,561 A * 3/1993 Bunczek et al. ............... 426/3
5,358,186 A 10/1994 Kataoka et al.
5,587,178 A 12/1996 Slangen
5,827,562 A * 10/1998 Fry et al. ..................... 426/548

FOREIGN PATENT DOCUMENTS

| CA | 1 027 113 | 2/1978 |
| EP | 574 983 | 12/1993 |
| EP | 585 880 | 3/1994 |
| WO | 84/02450 | 7/1984 |
| WO | 90/11020 | 10/1990 |
| WO | 92/07473 | 5/1992 |

* cited by examiner

Primary Examiner—Russell Travers
Assistant Examiner—Shengjun Wang
(74) Attorney, Agent, or Firm—Pillsbury Winthrop LLP

(57) ABSTRACT

The invention relates to chewing gums containing dipeptide sweetener, both in a sugar-free and in a sugar-containing form, and other chewable products. Improved flavor, in terms of both quality and persistence, in particular in the case of products which also contain flavorings based on aldehydes, is achieved when the dipeptide sweetener is a sweetening salt of an aspartic-acid-derived dipeptide sweetener and a derivative of a sweetening acid. The particle size of the sweetening salt is preferably smaller than 200 μm, and the sweetening salt is preferably present in a quantity from 100 to 6000 ppm.

The invention also relates to processes for production of such chewing gums.

16 Claims, No Drawings

CHEWING GUM CONTAINING DIPEPTIDE SWEETENER WITH LENGTHENED AND IMPROVED FLAVOR

This is a Continuation of International Appln. No. PCT/NL97/00414 filed Jul. 14, 1997 which designated the U.S., which claims foreign priority of Netherlands application No. 1003606, filed Jul. 16, 1996.

The invention relates to chewing gums containing dipeptide sweetener. The term "chewing gums" as used in this application refers to all forms of chewing gum products and includes the normal chewing gums and the so-called "bubble gums", both in a sugar-free and in a sugar-containing form. The term "chewing gums" also includes all other forms of chewable products sweetened with dipeptide sweetener, such as chewing tablets based on gum. The invention is intended to improve the flavour of such chewing gums, both insofar as the quality of flavour is concerned and also insofar as the persistence of the flavour is concerned. In particular the invention relates to chewing gum products sweetened with a dipeptide sweetener which contain flavourings based on aldehydes (i.e. the so-called aldehyde flavour products, or aldehyde flavourings). The term "aroma substances" is sometimes used instead of "flavourings".

Chewing gums sweetened with dipeptide sweetener are known and described in various patent publications, for example in WO-90/06689, where it is stated that the perception of flavour when consuming the chewing gum can be lengthened by adding spicy plant extracts (so-called "spice ingredients"). WO-92/07473 describes chewing gums in which longer and improved flavour is achieved by using coated synergistic mixtures of the two intensive sweeteners aspartame and acesulfame-K; it also reports that there are less marked effects as regards stability problems which can arise with aspartame in the presence of aldehydes, ketones, moisture, etc. So-called Maillard reactions, for example, can occur. Such problems of course also affect the stability of the chewing gums during storage, the storage stability.

Chewing gums sweetened with dipeptide sweetener are commercially available, in various flavours, including aldehyde flavour or mint flavour, such as products from the Wrigley range, e.g. Wrigley's Extra PlenTpak with cinnamon flavour and Wrigley's Orbit with mint flavour.

For the purposes of this application "dipeptide sweetener" means products with a sweetening power which is many dozens of times stronger than that of sugar, and which are made up of amino acids or derivatives of amino acids linked via a peptide bond. The best-known examples of dipeptide sweeteners are aspartame and alitame.

Aspartame ($\alpha$-L-aspartyl-L-phenylalaninemethylester), hereinafter also referred to as APM, is a dipeptide sweetener with a sweetening power which is approximately 200× that of sucrose. Aspartame is used as an intense sweetener in many applications because of its good flavour properties and low-calorie characteristics. Aspartame is also widely used in chewing gums.

Alitame (L-$\alpha$-aspartyl-n-(2,2,4,4-tetramethyl-3-thietanyl)-D-alanineamidehydrate), hereinafter also referred to as ALI, is a dipeptide sweetener with a sweetening power which is approximately 2000× that of sucrose.

It is also known that dipeptide sweeteners in chewing gums are used in the form of blends, i.e. physical mixtures, with other sweeteners. See for example Patent WO-92/07473, already mentioned above, in which a (coated) blend of APM and acesulfame-K (the potassium salt of 6-methyl-1,2,3-oxathiazin-4(3H)-one-2,2-dioxide, hereinafter also referred to as Ace-K) is used.

As is to some extent already apparent from the foregoing, the use of dipeptide sweeteners in chewing gums etc., in particular in chewing gums which contain flavourings based on aldehydes, is impeded by problems resulting from the somewhat limited chemical stability of the dipeptide sweeteners, in addition to problems with regard to the fact that the release of the sweet taste in the relevant applications (the so-called "sweetness release") is not optimal. WO-92/07473 and EP-A-0457724, for example, state that aspartame shows instability in the presence of aldehydes, ketones, moisture etc. This is already detrimental during the production of the chewing gums, but also detrimental to the storage stability of the products in which the said components are present together, as the sweetening power decreases as a result. Under such circumstances, as a result of unwanted reactions, there may also be discoloration of the (solid) products in which a dipeptide sweetener is incorporated.

In the prior art efforts have been made to find solutions with the aim of lengthening the perception of flavour when consuming chewing gums, and also with the aim of combating stability problems due to the presence of dipeptide sweetener in chewing gums, by for example providing the dipeptide sweetener with a coating, in an extra process step. This is described in EP-A-0461197, for example. As described in EP-A-0160607, for example, attempts have also been made to combat stability problems in chewing gums containing aldehydes, for example, by applying the dipeptide sweetener to the surface of the chewing gum. All this has disadvantages, however, in terms of the complexity of manufacture and requires additional process steps. In addition, so-called "hot spots" may occur in chewing gums which are sweetened with coated sweeteners. In order to improve these various aspects, blends of a dipeptide sweetener and another intense sweetener, such as acesulfame-K or saccharin, are therefore also used in chewing gums. When such blends are used, there will usually be different peaks in the perception of the sweetness during consumption of a chewing gum, because of differences in the sweetening profiles of the various sweeteners, and there is also a risk that a bitter or pungent flavour may be perceived at certain periods during consumption. In addition it should be noted that attempts have also been made to influence the profile of the release of sweetening power in chewing gums etc. by varying the particle size of the dipeptide sweetener used in these products (see for example EP-A-0427541), or by appropriate choice of the location of the sweetener in the chewing gum product to be sweetened (e.g. by powdering the outside of chewing gum strips with sweetener or by providing the chewing gum itself with a coating which is also sweetened and optionally contains an aldehyde aroma component, as is described for example in EP-A-0129584).

According to the prior art there is thus still no entirely satisfactory solution for producing a desired sweetness level and sweetening power profile in chewing gums—in terms inter alia of the intensity, quality and persistence of the sweet taste perception—during the consumption time while chewing, and in addition the consumption time is generally found too short. This is especially the case when the chewing gums also have reduced storage stability (i.e. loss of sweetening power during storage).

There is therefore a need to provide chewing gums containing dipeptide sweetener with a lengthened and improved flavour. There is also a need for a method of producing such chewing gums with a lengthened and improved flavour in a simple way. In particular there is a need to improve the flavour quality and the persistence of the flavour of chewing gum products sweetened with a dipeptide sweetener which contain flavourings based on aldehydes.

Surprisingly, extensive research by the applicant has now yielded chewing gums containing dipeptide sweetener with outstanding flavour quality and persistence of flavour, where the dipeptide sweetener is a sweetening salt of an aspartic-acid-derived dipeptide sweetener and a derivative of a sweetening acid. It has been found that chewing gums with such a composition show a surprisingly long duration of the sweetening power during consumption and have very good flavour quality.

In particular it has also been found that chewing gum products sweetened with a dipeptide sweetener which contain flavourings based on aldehydes show a surprisingly long duration of the sweetening power during consumption and have very good flavour quality when the dipeptide sweetener is a sweetening salt of an aspartic-acid-derived dipeptide sweetener and a derivative of a sweetening acid. This is true both when the chewing gums are consumed shortly after their manufacture and when the chewing gums are stored for a long period, e.g. a few months, before being consumed. The storage stability of such products is therefore also considerably better than that of chewing gums sweetened with a (free or mixed) dipeptide sweetener.

Sweetening salts of an aspartic-acid-derived dipeptide sweetener and a derivative of a sweetening acid as meant here are described in CA-A-1027113 and ES-A-8604766, and also in Belgian patent application No. 9500836, which had not been prepublished on the priority date of the present application and which led to inter alia EP-A-0768041. Derivatives of sweetening acids as meant here are (derivatives of) organic acids corresponding to an intense sweetener which is not derived from aspartic acid. From none of the documents mentioned here, in which moreover possibilities of application for the sweetening salts in question are only indicated in very general terms without showing concrete applications, can it be inferred or expected that these sweetening salts in chewing gums have such a strong effect on the duration of the sweetening power during consumption or on flavour quality and stability. This is relevant not only in comparison with chewing gum products in which only a dipeptide sweetener is present as the sweetening component but also in comparison with chewing gum products in which the dipeptide sweetener is used in the form of a blend.

Examples of suitable sweetening salts which according to the invention can be used in chewing gums are: salts of aspartame (APM) or alitame (ALI) with acesulfamic acid (i.e. the acid derived from Ace-K), with saccharic acid (1,2-benz-isothiazol-3(2H)-one-1,1-dioxide) and with cyclohexylsulfamic acid (cyclamate). The most suitable one is the salt of aspartame and acesulfamic acid, hereinafter also referred to as APM-Ace or as the APM-Ace salt; particularly suitable is the exceptionally stable, non-hygroscopic product as obtained in solid form by the method in Belgian non-prepublished patent application No. 9500836. In said method aspartame and a salt of acesulphamic acid are allowed to react in an aqueous medium in the presence of a strong acid, and the APM-Ace formed is isolated from the reaction mixture.

The particle size of the sweetening salts which under this invention are used in the relevant chewing gums, and in particular the particle size of the sweetening salts as present at the time of manufacture of the chewing gums, is not particularly critical, but is generally not more than 500 $\mu$m. The presence of larger particles in the chewing gum causes less homogeneous and less balanced release of the sweetening power during consumption. Use of a sweetening salt with a particle size <350 $\mu$m offers advantages in terms of the flavour quality of the chewing gum. The best flavour quality is achieved if the particle size of the sweetening salt is in the range <100 $\mu$m, but particles in the range 100–200 $\mu$m also give products with excellent and lengthened flavour when used in chewing gums. In a number of cases somewhat better stability of the products is also obtained with sweetening salt particles in the range 100–200 $\mu$m. By choosing the particle size of the sweetening salt to be used, the specialist can achieve further fine-tuning of the desired flavour quality and stability.

The content of sweetening salt in the chewing gums according to the invention can vary within a very wide range, but it should generally lie within the range from 100 to 6000 ppm (calculated relative to the total mass of the chewing gum).

It will be clear to the specialist that although chewing gums with a lengthened flavour are already produced according to the invention, the flavour profile of the chewing gum products can be further adjusted by adding additional small quantities of a separate intense sweetener or a blend of sweeteners, in addition to choosing the particle size of the sweetening salt. Accelerated emergence of the sweet flavour, the so-called "up-front release", can thus be achieved, for example. In addition, the flavour profile of the chewing gums can be further influenced by applying all or a proportion of the particles of the sweetening salt in the chewing gum in coated form, or by adding the additional small quantity of a separate intense sweetener (if one is used) to the chewing gum also partially or entirely in coated form. Application of part or all of the sweetener in coated form ensures an adapted profile of the release of the sweet flavour and can thus be regarded as a form of "controlled release". In addition, all the known techniques in relation to the technical shaping of the final product (the chewing gum) and/or the components to be incorporated, such as the sweetening salt, are of course also available to the specialist in order to achieve further desired flavour effects and/or aesthetic effects. Examples of such techniques in relation to the technical shaping of the components are granulation, grinding, freeze-drying, spray-drying, agglomeration etc. The invention is in no way limited with regard to the place where the sweetening salt used according to the invention is located in or on the chewing gum.

As is known and customary, chewing gums consist in large part (about 5 to 95% by wt) of a so-called "gum base" and all sorts of additives, such as aroma substances. The gum base generally consists of a combination of natural gums and/or synthetic elastomers and resins, and also contains softeners and (5 to 60% by wt) inorganic fillers. The gum base may also contain other components such as antioxidants, colorants and emulsifiers. Within the framework of the present invention the kind and nature of the components of the gum base is not critical, but it is self-evident that if aldehydes, ketones etc. are present in the gum base, there may be a detrimental effect on the properties of chewing gums which contain APM, for example, as sweetener. Furthermore, the chewing gums contain all sorts of flavourings which may originate from natural plant extracts or be obtained synthetically.

Examples of aldehyde flavourings which can be used in chewing gums are acetaldehyde, benzaldehyde, anisaldehyde, cinnamaldehyde, citral, $\alpha$-citral, $\beta$-citral, decanal, ethyl vanillin, heliotropin (piperonal), vanillin, $\alpha$-amyl-cinnamaldehyde, citronellal, aldehyde C-8, aldehyde C-9, aldehyde C-12, trans-2-hexenal, veratraldehyde, etc.

Examples of ketones which can be used in chewing gum products are acetophenone, acetone, methyl-n-amylketone, p-hydroxyphenyl-2-butanone, α-ionone, β-ionone, methyl-3-butanone, 2-heptanone, o-hydroxy-acetophenone, 2-methyl-2-hepten-6-one, 2-octanone, 2-undecanone and 2-pentanone.

Besides the sweetening salts to be used according to the invention, food sugars and/or other sweeteners can also be present in the chewing gums according to the invention. Examples of these are aspartame, alitame, acesulfame-K, saccharinates, cyclamates, glycyrrhizin, thaumatin, monellin, neohesperidin dihydrochalcone (abbreviated to NHDC), sucralose, sorbitol, mannitol, xylitol, hydrogenated starch hydrolysates, dextrins, maltitol, sucrose, dextrose, glucose syrups, fructose, fructose syrups, etc., or combinations thereof.

The invention will now be clarified by means of some tests and comparative tests, but is in no respect limited to these.

The sweetening salt of aspartame and acesulfamic acid (hereinafter referred to as APM-Ace) used in the chewing gum products tested was produced by the method in Experiment 4a of Belgian non-prepublished patent application No. 9500836. The procedure was as follows:

608 g of APM and 410 g of AceK (each 2.0 mol) were added consecutively to 2 l of water at 20° C., after which the resultant slurry was brought to 50° C. and 370 g of 20% HCl in water was added, with stirring, over 30 minutes. In this operation the initially rather voluminous slurry changed into a less voluminous slurry. At the end of the addition of HCl the slurry obtained was cooled to 10° C. over about 30 minutes via indirect heat exchange with a cooling medium at 0° C. and was then filtered off. The crystalline mass obtained was washed with a minimum quantity of chilled water and dried in a vacuum at 40° C. This produced in total 820 g (i.e. a yield of 90%) of a white product which according to $^1$H-NMR consisted entirely of the 1:1 salt of APM and acesulfamic acid, with a purity >99%. The moisture content was 0.12%. Two fractions were separated from this product by sieving procedures: an initial fraction with particles <100 μm and a fraction with particles of 100–200 μm.

For comparison purposes corresponding particle size fractions were also made from each of the sweeteners aspartame and acesulfame-K separately, and 1:1 blends on a molar basis were made up, both for APM and Ace-K with a particle size <100 μm and for APM and Ace-K with a particle size in the range 100–200 μm. These blends had a composition of approximately 3:2 by weight. When they were used in the chewing gums, the quantity of the blends taken in each case was such that (allowing for corrections for the potassium content in Ace-K and for the water content, determined by the "loss-on-drying" method, in APM) the same amount of aspartame was added to the chewing gums as in the case of addition of the sweetening APM-Ace salt.

As part of the investigation, tests were made with chewing gums with mint flavour and chewing gums with cinnamon flavour. Tests (and comparative tests) were carried out in order to determine various sensory properties ("attributes"). For the chewing gums with cinnamon flavour analytical tests with regard to the storage stability of the chewing gums were also made in addition to the sensory tests. All the chewing gums tested were made in accordance with a standard formulation consisting of a sugar-free gum base and sorbitol. The formulations for the M tests (mint flavour) and the K tests (cinnamon flavour) conformed to the following composition:

| Ingredients (% w/w): | mint tests M | cinnamon tests K |
| --- | --- | --- |
| sorbitol powder (P60W, Roquette) | 53.1 | |
| sorbitol powder (P100T, Roquette) | | 52.4 |
| sugar-free gum base (Valencia-T, Cafosa) | 24.5 | 24.6 |
| sorbitol solution (Neosorb 70/70; Roquette) | 16.1 | 16.2 |
| glycerine | 4.8 | 4.8 |
| mint flavour (214707; Haarman + Reimer) | 1.5 | |
| cinnamon flavour (17.42.7305, IFF) | | 2.0 |
| | 100.0 | 100.0 |

2700 ppm of the sweetener APM-Ace to be used according to the invention was also incorporated in these compositions, in two separately tested fractions in terms of particle size, viz. a fraction <100 μm (see tests M1 and K1) and a fraction of 100–200 μm (see tests M2 and K2).

For comparison purposes, tests were made with compositions with mint and cinnamon flavour, respectively, as indicated above, in which the 2700 ppm of APM-Ace was replaced by 3000 ppm of a blend of APM and Ace-K (in a 1:1 molar ratio; 3:2 ratio by weight). In determining the amount of 3000 ppm allowance was made for the correction for the water content of APM (according to the "loss-on-drying" method) and the potassium content of Ace-K. In order to optimize comparability, use was also made of blends in two different fractions in terms of particle size: a fraction with APM and Ace-K particles <100 μm (see comparative tests M1A and K1A) and a fraction with APM and Ace-K particles of 100–200 μm (see comparative tests M2A and K2A).

In addition, for comparison purposes, a commercially available chewing gum, namely Wrigley Peppermint Orbit, was also tested in the sensory tests on the chewing gums with mint flavour. The APM used in these chewing gums has a coating.

The tests and comparative tests can be represented schematically as follows:

| | | Mint | Cinnamon | |
| --- | --- | --- | --- | --- |
| APM-Ace | <100 μm | M1 | K1 | test |
| APM + Ace-K | <100 μm | M1A | K1A | comp. test |
| APM-Ace | 100–200 μm | M2 | K2 | test |
| APM + Ace-K | 100–200 μm | M2A | K2A | comp. test |
| commercial product | | MB | KB | comp. test |

The procedure for making the test chewing gums (including that for the comparative test chewing gums MA and KA) was in each case as follows:

The gum base was put into a Z-blade mixer and softened in it with heating to a final temperature of 50 to 60° C. and stirring. In each formulation the sweetener in the amount indicated (see above) was first dispersed in the sorbitol powder, while the sorbitol solution with the glycerine was also heated, to 60° C., before the sorbitol powder and sorbitol solution were both added to the gum base, with stirring. The whole was mixed for 10 minutes at the above-mentioned temperature, and then for a further 10 minutes with the heating element switched off. The dough obtained was rolled out with a dough roller ("pastry brake") to a thickness of 1.5 mm. Strips of 73×19 mm, which were each packed in foil (as is usual for chewing gum), were cut out of the rolled-out mass.

Part of the chewing gums made in this way was then kept frozen in order that samples which best approximated to the original condition of the relevant chewing gum would be available for comparison at any desired time; the remaining part was subjected to sensory tests a short time (i.e. within a week) after production. Part of the chewing gums with cinnamon flavour was stored at 20° C. (storage-quality tests). Sensory tests were made on these chewing gums after 4 and 12 weeks as well as after 52 weeks of storage, with comparisons also being made with corresponding chewing gums that had been kept frozen at −18° C. Another part of the chewing gums with cinnamon flavour was kept at 40° C., as an accelerated keeping-quality test. The storage stability of these chewing gums was monitored by analysis of the content of APM and Ace-K (or Ace) after 14 and 28 days of storage.

As regards the sensory tests, the chewing gums were evaluated by an experienced panel, with 6 members, for:

sweetness intensity, hereinafter referred to as "SI";

sweetness quality, hereinafter referred to as "SQ", particular attention being paid to off-flavours such as metallic flavour and bitterness;

release of the desired flavour (here mint and cinnamon flavour, respectively), hereinafter referred to as "FR"; and for overall acceptability of the chewing gum, hereinafter referred to as "OA", these evaluations in each case being made after 30 seconds, 2 minutes, 6 minutes, 10 minutes and 15 minutes of chewing.

Precise records were kept of the observations. These records for the mint flavour products, as evaluated within one week after production, are summarized in Table I below. It should be noted that evaluation of these products after 12 weeks did not show any significant differences.

TABLE I

| | TEST M1 | COMP. TEST M1A | TEST M2 | COMP. TEST M2A | COMP. TEST MB |
|---|---|---|---|---|---|
| SI | slow start no peak but continuing sweetness which becomes stronger after 6 minutes; still fairly sweet even after 15 min. | slightly slow start; peak after 2 minutes; end at 6 minutes somewaht sweeter than M2A | slow start 1st peak after 1 3/4 min.; continuing sweet and even stronger after 6 min.; still fairly sweet after 15 min. | slightly slow start; peak after 2 min.; end at 6 minutes somewhat less sweet than M1A | immediately perceptible; 1st short peak after 15 sec. and 2nd peak after 6 min.; after 9 min. no longer nice, no longer sweet |
| SQ | good quality and good persistence not bitter | good, but percep-tible for too short a time not bitter | good; somewhat more of a peak tha M1; balanced sweetness; | good, but percep-tible for too short a time not bitter | reason-able with two distinct peaks not bitter |

TABLE I-continued

| | TEST M1 | COMP. TEST M1A | TEST M2 | COMP. TEST M2A | COMP. TEST MB |
|---|---|---|---|---|---|
| FR | good; somewhat less strong than M1A; flavour continues as long as sweetness | good; but as short as sweetness | flavour full; not bitter good; retention of flavour because of continuing sweetness | good, but somewhat sharper than M1A; as short as sweetness; unpleasant hot taste sensation after 10 minutes | |
| QA | markedly better than M1A | reasonable | very good | reasonable | |

Comparable results were found for the chewing gums with cinnamon flavour. For these products evaluations were also made after 4, 12 and 52 weeks of storage at 20° C. (with comparisons also being made in each case with original chewing gums of the same type which had been kept at −18° C.).

In the sensory tests with the cinnamon flavour chewing gums, too, the products according to the invention scored better in all cases than the corresponding comparison products. Both in the comparison products and in the products according to the invention, however, a deterioration of attributes as a result of storage at 20° C. was observed. In all the products there was slight discoloration relative to the products which had been kept under deep-freeze conditions. When the cinnamon chewing gums products sweetened with the sweeteners <100 μm and 100–200 μm were compared with each other, the former products were found to deteriorate somewhat more in terms of sweetness than the latter, but in both types of product there was perceptible sweetness and flavour throughout the 15 minutes of the sensory tests. The overall flavour score for the products which were sweetened with the smaller particles was somewhat higher (both for the products with mint flavour and for those with cinnamon flavour) than for the products which were sweetened with the larger particles. In the comparison chewing gums with cinnamon flavour (in the samples tested after 4 weeks) there was no longer any percep- tible sweetness or flavour after about 6–8 minutes.

The sensory findings for the cinnamon flavour products, as evaluated after 4, 12 and 52 weeks of storage, are summarized in Tables II, III and IV below. The bottom row in these tables shows the differences from the frozen chewing gums.

TABLE II

Storage time four weeks at 20° C.

| | TEST K1 | COMP. TEST K1A | TEST K2 | COMP. TEST K2A |
|---|---|---|---|---|
| SI | faster start than K1A; good build-up of sweetness; peak after 2 minutes; then | slow but good in terms of build-up; peak after 2 minutes; then marked decrease | slow start; slow build-up of sweetness; peak after 2 minutes; decrease in sweetness but | faster build-up of sweetness than K1A; somewhat hotter taste than K1 or |

TABLE II-continued

Storage time four weeks at 20° C.

| | TEST K1 | COMP. TEST K1A | TEST K2 | COMP. TEST K2A |
|---|---|---|---|---|
| | decrease in sweetness; sweetness remains clearly perceptible for more than 15 minutes | in sweetness; still slightly sweet after 6 minutes; flat flavour after 10 minutes | less than K2A (and than K1 and K1A); lengthened sweetness and flavour profile for more than 15 minutes | K1A; rapid decrease; scarcely any sweetness left at 4 minutes; scarcely any flavour left after 8 minutes |
| SQ | good quality and good persistence; no off-taste, not bitter; better than K1A | good, but perceptible for too short a time; no off-taste, not bitter | good; no off-taste perceptible; not bitter | good, but perceptible for too short a time; no off-taste; not bitter |
| FR | good; sweetness and flavour remain clearly perceptible | good, but as short as sweetness | good; retention of flavour because of continuing sweetness | good, but somewhat sharper than K1A; as short as sweetness |
| OA | markedly better than K1A; somewhat better than K2 | reasonable | markedly better than K2A | reasonable |
| *) | as sweet after 2 minutes; somewhat faster decrease in sweetness relative to REF | less intensely sweet and less flavour than REF | slower start to sweetness build-up; somewhat later but equally strong peak | slower start to sweetness build-up |

*) relative to product stored at −18° C. (REF)

TABLE III

Storage time 12 weeks at 20° C.

| | TEST K1 | COMP. TEST K1A | TEST K2 | COMP. TEST K2A |
|---|---|---|---|---|
| SI | rather slow start; good build-up from 40 sec. onwards; peak after 2 minutes; rather less than for K1A; then decrease in sweetness but not as fast as K1A; sweetness and flavour remain for more than 15 minutes | slow but build-up after 30 sec.; peak after 2 minutes; than marked decrease in sweetness; still slightly sweet after 4 minutes; very flat flavour after 6 minutes; an effort to continue chewing | slower start than K2A; slow build-up of sweetness; peak after 2.5 minutes; decrease in sweetness, but less than K2A; lengthened flavour and sweetness profile for more than 15 minutes | slow start; build-up of sweetness to peak after 2 minutes; rapid decrease; scarcely any sweetness left at 3.5 minutes; scarcely any flavour left after 6 minutes; no sweetness or flavour perceptible after 10 minutes |
| SQ | reasonable quality and good persistence; not bitter; better than K1A | reasonable, but very sharp refreshing taste at the back of the tongue; not bitter | reasonable; not bitter | reasonable beginning, but perceptible for too short time; not bitter |
| FR | flavour peak after 2 minutes; reasonable; sweetness and flavour remain | moderate with dull flavour, but as short as sweetness | reasonable; retention of flavour because of continuing | reasonable, but sharp burnt flavour at beginning; flavour and |

TABLE III-continued

Storage time 12 weeks at 20° C.

| | TEST K1 | COMP. TEST K1A | TEST K2 | COMP. TEST K2A |
|---|---|---|---|---|
| | clearly perceptible | | sweetness; somewhat flatter than K2A | sweetness present for too short a time |
| OA | markedly better than K1A | reasonable | remains sweet and tasty for 15 min. | reasonable |
| *) | rather more discoloured; sweetness profile identical but rather lower intensity and after 10 minutes rather less flavour | rather more discoloured; more refreshing; sweetness profile identical but intensity much lower; flavour less fresh | rather more discoloured; slower build-up of sweetness and rather less intensely sweet; rather less flavour, but better than K2A | rather more discoloured; sweetness intensity much less, faster decrease in sweetness and flavour |

*) relative to product stored at −18° C. (REF)

TABLE IV

Storage time 12 weeks at 20° C.

| | TEST K1 | COMP. TEST K1A | TEST K2 | COMP. TEST K2A |
|---|---|---|---|---|
| SI | slow start; build-up from 15 sec onwards; peak after 2.5 minutes; persists longer than K1A; then some decrease in sweetness, which increases again after 6 minutes; sweetness and flavour remain for more than 15 minutes | slow start but build-up after 30 sec; low peak after 2 minutes; then rapid decrease in sweetness; still slightly sweet after 3 minutes; flat flavour after 6 minutes; an effort to continue chewing | slow start but reasonable build-up of sweetness; wide peak after approx. 2.5 minutes; sweetness fades slowly but returns after 6 minutes; lengthened flavour and sweetness profile though less than with K1 | slow start; sweetness builds up to low level; peak after 2.5 minutes; rapid decrease; scarcely any sweetness left at 4 minutes; flavour becomes unpleasant from 6 minutes onwards |
| SQ | reasonable quality and good persistence; not bitter; better than K1A | moderate and brief; "drying" character already after some minutes | reasonable; not bitter; less than with K1 | moderate and brief |
| FR | flavour peaks after 2.5 minutes; reasonable; sweetness and flavour remain well perceptible | reasonable with dull taste, but as brief as sweetness | reasonable; because of lasting sweetness | moderate; flavour and sweetness too briefly present; too soon unpleasant |
| OA | reasonable; much better than K1A | poor | remains acceptable enough to continue chewing | poor |
| *) | slightly more discoloured; identical sweetness | slightly more discoloured; more | slightly more discoloured; slower | slightly more discoloured; sweetness |

TABLE IV-continued

Storage time 12 weeks at 20° C.

| TEST K1 | COMP. TEST K1A | TEST K2 | COMP. TEST K2A |
|---|---|---|---|
| profile but somewhat slower build-up and less intense; both samples are still agreeable after 15 minutes | refreshing; sweetness profile identical but slower build-up and intensity distinctly lower; flavour becomes unpleasant already after 6 minutes; no discernible difference after 15 minutes | build-up of sweetness and somewhat less sweet; slightly less flavour but better than K2A; both samples still agreeable after 15 minutes | intensity distinctly lower; more rapid decrease in sweetness and flavour; even less pleasant flavour |

*) relative to product stored at −18° C. (REF)

The results of the sensory tests made with the cinnamon (aldehyde) flavour test chewing gums and comparison chewing gums were also confirmed by accelerated ageing tests (at 40° C.), in which the contents of APM and Ace-K (or Ace) were determined by HPLC (high-pressure liquid chromatography). An overview of the relevant HPLC analysis results is given in Table V below:

TABLE V

Relative decrease in contents of APM and Ace-K or Ace during storage at 40° C. for:

| sample | comp. | 0 days content (%) | 14 days residual content (%) | 28 days residual content (%) |
|---|---|---|---|---|
| <100 $\mu$m | | | | |
| K1 | APM | 100 | 47 | 36 |
| | Ace | 100 | 100 | 95 |
| K1A | APM | 100 | 10 | 0 |
| | Ace-K | 100 | 94 | 95 |
| 100–200 $\mu$m | | | | |
| K2 | APM | 100 | 45 | 44 |
| | Ace | 100 | 83 | 84 |
| K2A | APM | 100 | 16 | 0 |
| | Ace-K | 100 | 96 | 100 |

The presence of sweetening salts in chewing gum products can be determined by IR-spectroscopic techniques.

What is claimed is:

1. Chewing gum containing dipeptide sweetener in addition to an aldehyde flavoring substance, wherein the dipeptide sweetener is a crystalline salt of aspartame and acesulphamic acid having a purity of greater than 99%, isolated as a reaction product of aspartame and salt of acesulphamic acid in an aqueous medium in the presence of strong acid.

2. Chewing gum according to claim 1, wherein the salt of aspartame and acesulphamic acid is a crystalline salt isolated from a reaction product of aspartame and potassium acesulphamate in an aqueous medium in the presence of hydrochloric acid.

3. Chewing gum according to claim 1, wherein the crystalline salt is at least partially non-encapsulated.

4. Chewing gum according to claim 1, wherein the particle size of the sweetening salt is smaller than 500 $\mu$m.

5. Chewing gum according to claim 4, wherein the sweetening salt in the chewing gum, at the time of preparation of the latter, is present in an amount of 100 to 500 ppm (relative to the total mass of the chewing gum).

6. Chewing gum according to claim 1, wherein the taste profile of the chewing gum has been adapted yet further due to part of the sweetening salt having been applied in coated form or in a suitable technical shape or due to further amounts of a sweetener having been added to the chewing gum at one or more suitable places in it or due to the technical shape of the chewing gum having been suitably adapted.

7. Chewing gum according to claim 1, wherein the particle size of the sweetening salt is smaller than 350 $\mu$m.

8. Chewing gum according to claim 1, wherein the particle size of the sweetening salt is smaller than 200 $\mu$m.

9. Chewing gum according to claim 1, wherein the particle size of the sweetening salt is smaller than 100 $\mu$m.

10. Process for the preparation of chewing gums containing dipeptide sweetener and having an aldehyde flavoring substance, comprising: adding non-encapsulated dipeptide sweetener to a chewing gum, wherein said dipeptide sweetener is a crystalline salt of aspartame and acesulphamic acid having a purity of greater than 99%, isolated as a reaction product of aspartame and salt of acesulphamic acid in an aqueous medium in the presence of strong acid.

11. Process according to claim 10, wherein the particle size of the sweetening is smaller than 500 $\mu$m.

12. Process according to claim 11, wherein the sweetening salt is used in an amount of 100 to 600 ppm (relative to the total mass of the chewing gum).

13. Process according to claim 10 or 12, wherein part of the sweetening salt has been applied in a coated form or in a suitable technical shape or with further amounts of a sweetening salt being added to the chewing gum or with the technical shape of the chewing gum being suitably adapted.

14. Process according to claim 10, wherein the particle size of the sweetening salt is smaller than 350 $\mu$m.

15. Process according to claim 10, wherein the particle size of the sweetening salt is smaller than 200 $\mu$m.

16. Process according to claim 10, wherein the particle size of the sweetening salt is smaller than 100 $\mu$m.

* * * * *

UNITED STATES PATENT AND TRADEMARK OFFICE
CERTIFICATE OF CORRECTION

PATENT NO.    : 6,495,121 B2
DATED         : December 17, 2002
INVENTOR(S)   : Fry et al.

It is certified that error appears in the above-identified patent and that said Letters Patent is hereby corrected as shown below:

<u>Title page, Item [54] and Column 1, line 1,</u>
Please correct the spelling of "DIPETIDE" in the title to read -- DIPEPTIDE --.

Signed and Sealed this

Eleventh Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,495,121 B2
DATED         : December 17, 2002
INVENTOR(S)   : Fry et al.

It is certified that error appears in the above-identified patent and that said Letters Patent is hereby corrected as shown below:

Title page,
Item [73], Assignee, please correct to read:
-- Holland Sweetener Company V.O.F. Geleen, (NL) --.

Signed and Sealed this

Eighth Day of July, 2003

JAMES E. ROGAN
*Director of the United States Patent and Trademark Office*